United States Patent [19]

Takeuchi et al.

[11] Patent Number: 5,793,297
[45] Date of Patent: Aug. 11, 1998

[54] SELF-MONITORING PRESSURE DETECTION APPARATUS AND METHOD

[75] Inventors: Takanobu Takeuchi; Tateki Mitani, both of Tokyo, Japan

[73] Assignee: Mitsubishi Denki Kabushiki Kaisha, Tokyo, Japan

[21] Appl. No.: 685,677

[22] Filed: Jul. 24, 1996

[30] Foreign Application Priority Data

Jan. 30, 1996 [JP] Japan ................................. 8-013794

[51] Int. Cl.[6] ........................................... G08B 21/00
[52] U.S. Cl. ...................... 340/635; 73/514.33; 73/728; 324/500; 324/537; 340/626; 340/665; 340/669
[58] Field of Search ............................ 340/635, 626, 340/665, 669; 324/537, 500; 73/514.33, 728

[56] References Cited

U.S. PATENT DOCUMENTS 4,712,098 12/1987 Laing ........................ 340/669
5,578,993 11/1996 Sitabkhan et al. ............ 340/626
5,583,490 12/1996 Santos et al. .................. 340/626

Primary Examiner—Glen Swann

[57] ABSTRACT

A pressure detection apparatus including a pressure detection diaphragm, pressure detection circuit for outputting a pressure detection signal proportional to a pressure applied to the pressure detection diaphragm and clamping circuit for clamping the pressure detection signal to a predefined maximum or minimum value when the detected pressure signal is larger than the maximum value or less than the minimum value. Signal clamping by the clamping circuit is cut-off or cancelled when the pressure applied to the pressure detection diaphragm causes an operational error. This operational error may be detected by forming part of the clamping circuit on a semiconductor diaphragm of the sensor. Also, a failure detection circuit may be used to detect sensor failure and then cancel signal clamping.

10 Claims, 12 Drawing Sheets

SELF-MONITORING PRESSURE DETECTION APPARATUS AND METHOD

BACKGROUND OF THE INVENTION

1. Field of the invention

The present invention relates to a pressure detection apparatus that clamps the output value of the detected pressure to a maximum or minimum value when the detected pressure output value exceeds either the maximum or minimum value, but which outputs a signal having a potential that is greater than the maximum value or is less than the minimum value when a problem occurs in the detected pressure value.

2. Description of the prior art

Pressure detection apparati that detect the pressure applied to a pressure detection member using a pressure sensor, then amplify the pressure sensor output using an amplifier, and finally extract the pressure signal from the final amplification stage, are known from the literature. When the pressure signal output from this pressure detection apparatus is then used for control or display purposes, a clamping circuit is provided at the final amplification stage to limit the range of the output voltage to the display range of the pressure gauge display, for example. More specifically, when the output voltage from the final amplification stage exceeds a predetermined upper limit, the output voltage is clamped to this upper limit, and if the output voltage from the final amplification stage drops below a predetermined lower limit, the output voltage is clamped to this lower limit.

The problem with this pressure detection apparatus using a clamping circuit at the final amplification stage to limit the output voltage range according to the prior art is that it is not possible for the pressure detection apparatus to detect when a problem or equipment failure has occurred in the pressure detection apparatus because the output voltage from the final amplification stage is held to the upper or lower limit values by the clamping circuit even when the applied pressure exceeds a predetermined threshold value and results in damage to the pressure detection apparatus.

SUMMARY OF THE INVENTION

The object of the present invention is therefore to provide a pressure detection apparatus capable of reliably self-detecting failures and problems in the pressure detection apparatus.

The second object of the present invention is to provide a pressure detection apparatus with even higher reliability.

The third object of the invention is to provide a pressure detection apparatus with a high degree of design freedom.

The fourth object is to provide a pressure detection apparatus that can be used as an acceleration sensor capable of reliably detecting an operational failure.

To achieve the above objects a pressure detection apparatus according to the invention includes clamping means for clamping the detected pressure signal, which is output by the final stage of the amplifying means used to amplify the signal output by the pressure detection member detecting the pressure applied thereto, to a predefined maximum or minimum value when said detected pressure signal is not between said predefined maximum and minimum values. This pressure detection apparatus cancels signal clamping by the clamping means when the pressure applied to the pressure detection member exceeds a predetermined value and results in an operational failure.

In the pressure detection apparatus, part of the clamping means may be formed on the pressure detection member such that signal clamping is interrupted when an operational failure occurs by interrupting part of the clamping means.

In the pressure detection apparatus, the pressure detection member may be a semiconductor diaphragm such that signal clamping is interrupted by destroying said semiconductor diaphragm when an operational failure occurs.

The pressure detection apparatus may further include failure detection means for detecting equipment failures and supplying a cancel clamping signal to the clamping means when an operational failure occurs.

The pressure detection apparatus is a pressure detection apparatus as described above wherein the failure detection means includes a resistance circuit, which has a resistance that is cut off when an operational failure occurs, and a comparator to which a comparison voltage is supplied from this resistance circuit.

The pressure detection apparatus may further form said resistance circuit on the semiconductor diaphragm.

In the pressure detection apparatus, the failure detection means may detect operational failures based on the output signal from the amplifying means preceding the final amplifying means, and supply the cancel clamping signal to the clamping means.

The pressure detection apparatus may detect a pressure value reflecting acceleration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein.

DESCRIPTION OF PREFERRED EMBODIMENTS

The preferred embodiments of the present invention are described below with reference to the accompanying figures.

Embodiment 1

Figure 1:
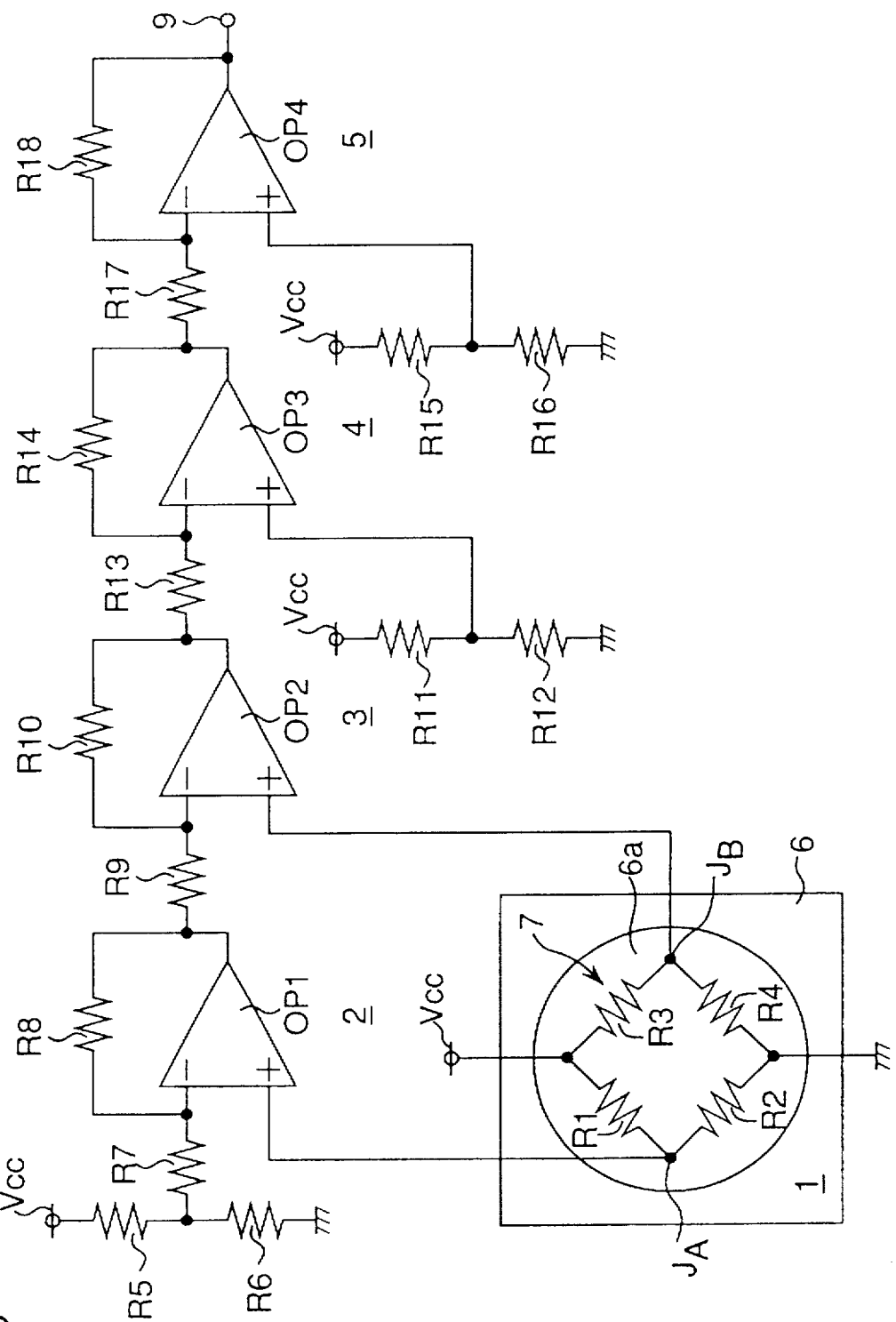
FIG. 1 is a circuit diagram of a pressure detection apparatus according to the first embodiment of the present invention.

FIG. 1 is a circuit diagram of a pressure detection apparatus according to the first embodiment of the present invention. This pressure detection apparatus includes a pressure sensor 1 which is an example of a pressure detection member and amplifier circuits 2-5 in a four stage amplifier circuit arrangement for amplifying the output from the pressure sensor 1.

The pressure sensor 1 is formed with a resistance bridge circuit 7 built on the diaphragm member 6a of the semiconductor diaphragm 6, which is described below with reference to FIGS. 3 and 4. The diaphragm member 6a of semiconductor diaphragm 6 deforms when pressure is applied thereto, producing stress in the diaphragm member 6a of the semiconductor diaphragm 6. The resistance of the four resistors R1-R4 in the resistance bridge circuit 7 varies according to the amount of stress produced, thereby generating a signal corresponding to the pressure applied to the pressure sensor 1.

The first amplifier circuit 2 is a non-inverting amplifier including an operational amplifier OP1 and resistances R5-R8, and amplifies the potential at junction JA between resistance R1 and resistance R2 of the resistance bridge circuit 7.

The second amplifier circuit 3 similarly includes an operational amplifier OP2 and resistances R9 and R10, and amplifies the difference between the potential at junction JB between resistances R3 and R4 of the resistance bridge circuit 7, and the output from the first-stage amplifier circuit 2.

The third amplifier circuit 4 is an inverting amplifier comprising an operational amplifier OP3 and resistances R11-R14. The fourth amplifier circuit 5 is also an inverting amplifier comprising an operational amplifier OP4 and resistances R15-R18. The specific design of the operational amplifier OP4 in the fourth amplifier circuit 5, i.e., the final amplification stage, is shown in FIG. 2 and described below.

Figure 2:
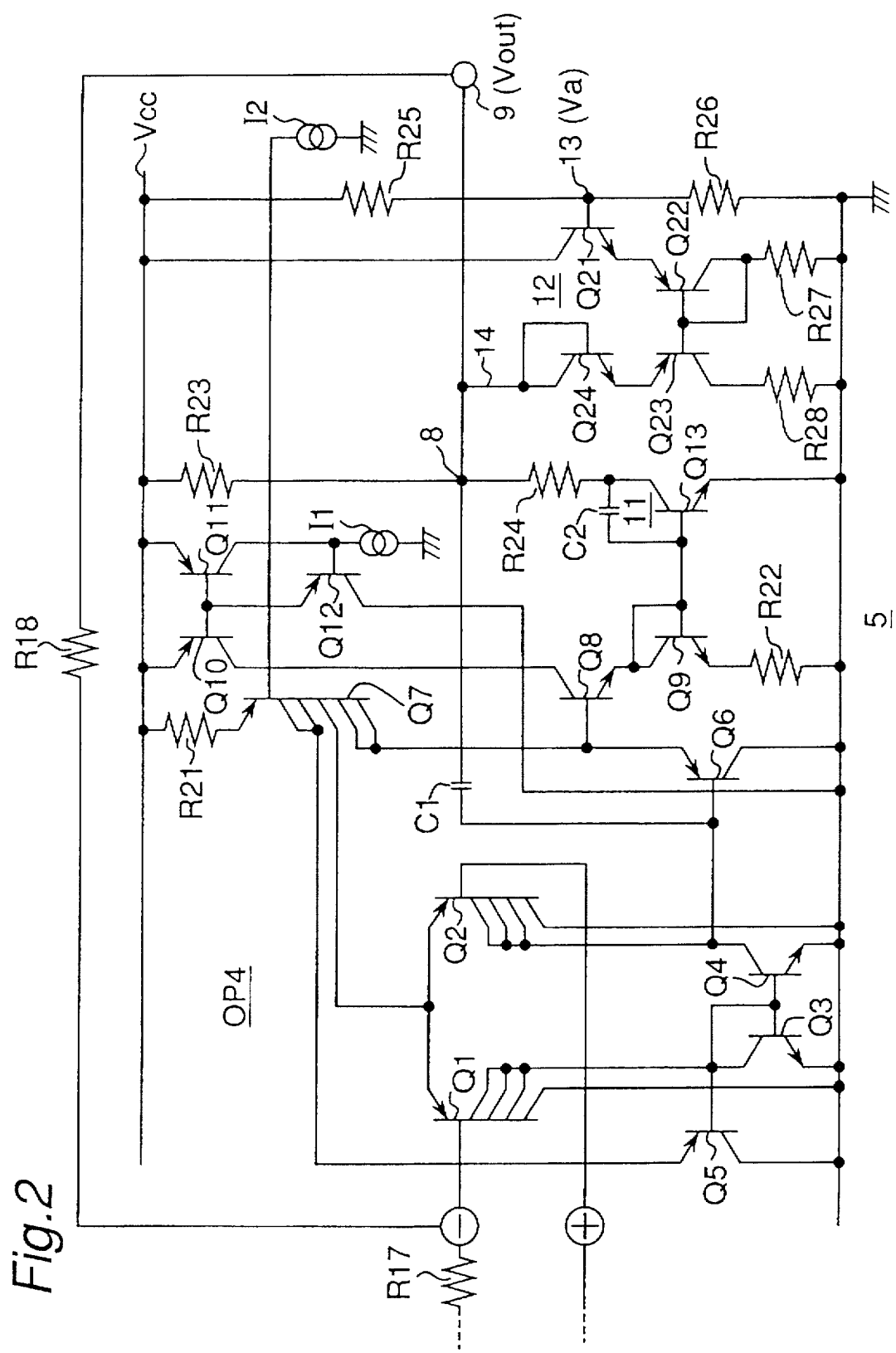
FIG. 2 is a circuit diagram of a specific embodiment of the last amplifier circuit in the pressure detection apparatus shown in FIG. 1 according to the first embodiment of the present invention.

Referring to FIG. 2, the circuit including transistors Q1-Q13, resistances R21-R24, constant current supplies I1 and I2, and capacitors C1 and C2 forms the operational amplifier OP4. Output transistor Q13 of the operational amplifier OP4 is an npn transistor of which the emitter is connected to the ground with resistances R23 and R24 serially connected between the collector and power supply line Vcc. Resistances R23 and R24 create a load resistance for transistor Q13 with the junction 8 between the resistances connected to the output terminal 9 of the operational amplifier OP4.

Resistance R24 and output transistor Q13 form the lower limit clamping circuit 11 for clamping the output voltage VOut output from the output terminal 9 of the operational amplifier OP4 4 to the lower clamping value VL.

Transistors Q21-Q24 and resistances R25-R28 form the upper limit clamping circuit 12 for clamping the output voltage $V_{out}$ from the output terminal 9 of the operational amplifier OP4 to the upper clamping value VU. Resistances R25 and R26 of the upper limit clamping circuit 12 are the resistances determining the upper clamping value VU, and are serially connected between the power supply line Vcc and ground. The base of an npn transistor Q21 is connected to the junction 13 between resistances R25 and R26. The collector of said transistor Q21 is connected to the power supply line Vcc, and the emitter is connected to the emitter of pnp transistor Q22. The base of this transistor Q22 is connected to the base of pnp transistor Q23 and the collector of transistor Q22; a resistance R27 is connected between the collector of transistor Q22 and the ground. A resistance R28 is similarly connected between the collector of transistor Q23 and the ground, and the emitter of transistor Q23 is connected to the emitter of npn transistor Q24. The base and collector of transistor Q24 are connected to the output terminal 9 by line 14.

Figure 3:
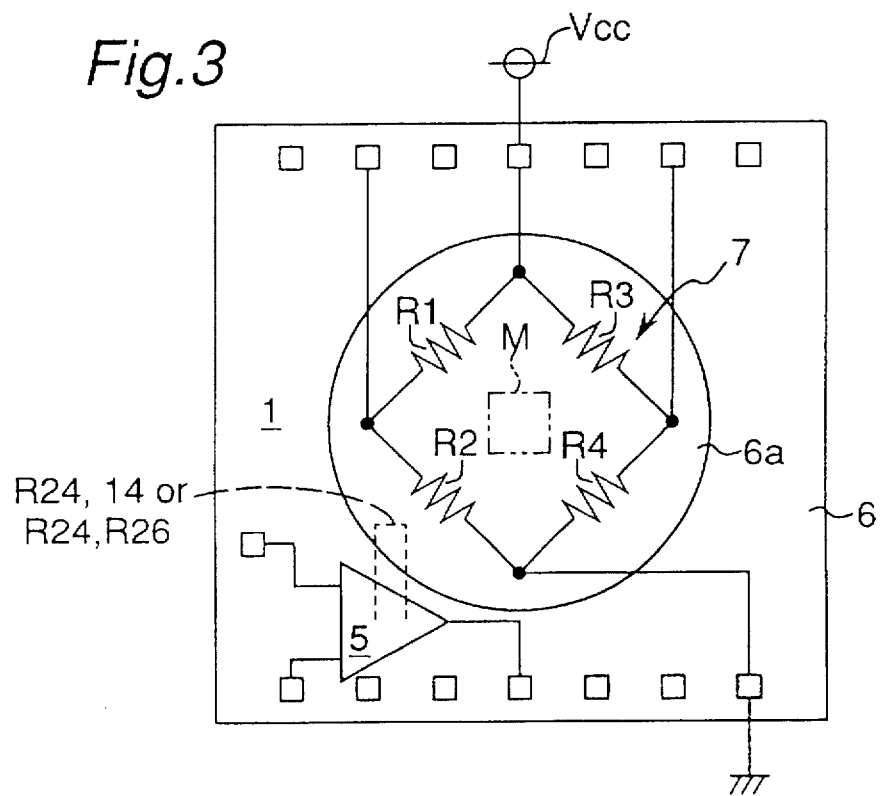
FIG. 3 is a plan view of the semiconductor diaphragm used as the pressure detection member in FIG. 1.
Figure 4:
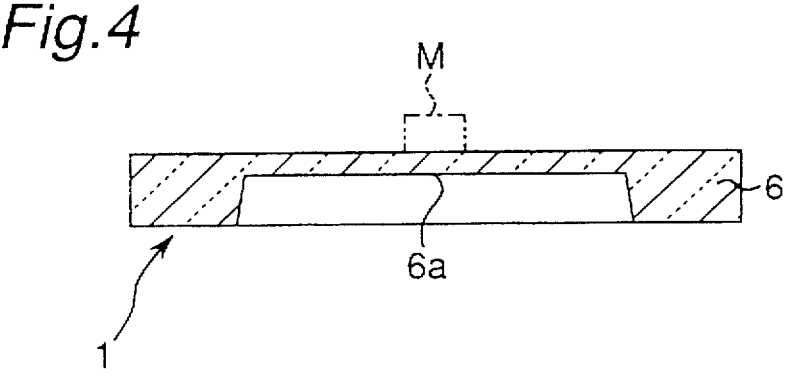
FIG. 4 is a cross section through the thickness of the semiconductor diaphragm shown in FIG. 3.

As shown in FIGS. 3 and 4, the fourth amplifier circuit 5 shown in FIG. 2 is formed on the semiconductor diaphragm 6 in this first embodiment of the invention with the resistance R24 connected to the collector of output transistor Q13 in the fourth amplifier circuit 5, and the line 14 between output terminal 9 and the collector of transistor Q24 of the upper limit clamping circuit 12, formed on the diaphragm member 6a of the semiconductor diaphragm 6. Note that the diaphragm member 6a is formed in the semiconductor diaphragm 6 by forming the area within a known radius from the center of a square semiconductor substrate with a thickness less than that of the surrounding substrate. The resistances R1-R4 of the resistance bridge circuit 7 described above with reference to FIG. 1 are then formed on the semiconductor diaphragm 6, or more specifically on the diaphragm member 6a.

In the normal state, i.e., the operating mode when the pressure applied to the diaphragm member 6a of the semiconductor diaphragm 6 is within the defined range not destructive to the diaphragm member 6a, the output voltage $V_{out}$ output from the output terminal 9 of operational amplifier OP4 rises linearly in proportion to the pressure applied to the diaphragm member 6a. When the output voltage $V_{out}$ rises to the potential Va of junction 13 between resistances R25 and R26 controlling the upper clamping value VU of the upper limit clamping circuit 12, transistor Q24 of the upper limit clamping circuit 12 becomes ON, clamping the output voltage $V_{out}$ to said potential Va.

In the upper limit clamping circuit 12, the potential of the emitter of npn transistor Q21 is equal to the value (Va−$V_{BE}$) of the transistor Q21 base/emitter voltage ($V_{BE}$) subtracted from the potential Va of the transistor base. Because the bases of two pnp transistors Q22 and Q23 are connected together, the emitter potentials of transistor Q22 and transistor Q23 are equal when the base/emitter voltages ($V_{BE}$) of these transistors Q22 and Q23 are equal. The emitters of transistors Q23 and Q24 are also connected together. As a result, the emitter potential of transistor Q24 is equal to the emitter potential of transistor Q21 (Va−$V_{BE}$). Therefore, if the output voltage $V_{out}$ of the operational amplifier OP4 exceeds the base potential Va of transistor Q21 when the base/emitter voltage ($V_{BE}$) of transistor Q22 is equal to the base/emitter voltage ($V_{BE}$) of transistor Q23, transistor Q24 becomes ON. As a result, the output voltage $V_{out}$ of the operational amplifier OP4 is clamped to the potential Va.

Conversely, when the pressure applied to the diaphragm member 6a of the semiconductor diaphragm 6 drops, the collector current flowing to the output transistor Q13 of the operational amplifier OP4 rises, and the output voltage from the output terminal 9 of the operational amplifier OP4 drops linearly according to the collector current rise. If the pressure continues to drop and the collector current flowing to the output transistor Q13 pushes the transistor Q13 from the linear operation range to the saturation range, the output voltage $V_{out}$ is clamped to the lower clamping value VL, which is determined by the current flowing to the resistance R24 of the lower limit clamping circuit 11 and the collector saturation voltage VCES of the output transistor Q13.

When pressure exceeding the breakdown threshold of the diaphragm member 6a of the semiconductor diaphragm 6 is applied and the diaphragm member 6a fails, the line 14 connecting the upper limit clamping circuit 12 and the load resistance R24 of the output transistor Q13 of the operational amplifier OP4 formed on the diaphragm member 6a breaks. When the line 14 breaks, the upper limit clamping circuit 12 ceases clamping the output voltage $V_{out}$ from the operational amplifier OP4. When the load resistance R24 of the output transistor 013 is cut off, the output voltage $V_{out}$ of the operational amplifier OP4 becomes substantially equal to the power supply line voltage Vcc as a result of resistance R23 if the external impedance (as seen from the output terminal 9) is sudstantially or effectively infinite. If the feedback resistance R18 of the operational amplifier OP4 is sufficiently great relative to resistance R23, the output voltage $V_{out}$ of operational amplifier OP4 attempts to hold the potential exceeding the upper clamping value VU.

This is described more specifically below. When, for example, the resistance of feedback resistance R18 is 200 kΩ, the resistance of resistance R23 is 5 kΩ, the power supply voltage Vcc is 5 V, and the potential of the non-inverting input terminal to the operational amplifier OP4 is 2.5 V, the output voltage VOUt is determined by the current whereby the 5-V power supply voltage Vcc flowing through resistance R23 and feedback resistance R18 produces a 2.5-V potential at the inverting input terminal of the operational amplifier OP4. In this case this current is (5−2.5)/ (200×10³+5×10³) $^a$ 12.2 μA, and the output voltage $V_{out}$ is (5 kΩ×12.2 μA=) 61 mV below the power supply voltage Vcc (=5 V), i.e., 4.939 V. Therefore, when the upper clamping value VU is set, for example, to 4.5 V and a output voltage $V_{out}$ exceeding the upper clamping value VU is output from the operational amplifier OP4, it can be determined that the diaphragm member 6a of the semiconductor diaphragm 6 has failed.

It should be noted that while in the first embodiment described above resistance R24 and the line 14 of the upper limit clamping circuit 12 shown in FIG. 2 are formed on the diaphragm member 6a of the semiconductor diaphragm 6, it is alternatively possible to form resistance R24 and resistance R26 of the upper limit clamping circuit 12 shown in FIG. 3 on the diaphragm member 6a of the semiconductor diaphragm 6. When the diaphragm member 6a of the semiconductor diaphragm 6 is damaged and resistance R24 and resistance R26 are cut off, the upper clamping value VU of the upper limit clamping circuit 12 is the power supply voltage Vcc, and the upper limit clamping circuit 12 ceases to function. As a result, when the diaphragm member 6a of the semiconductor diaphragm 6 is damaged and resistances R24 and R26 are cut off, the output voltage VOUt of the operational amplifier OP4 exceeds the upper clamping value VU, and the diaphragm member 6a of the semiconductor diaphragm 6 can be determined to have failed, as in the above case where interruption of the line 14 causes the upper limit clamping circuit 12 to stop functioning.

Embodiment 2

Figure 5:
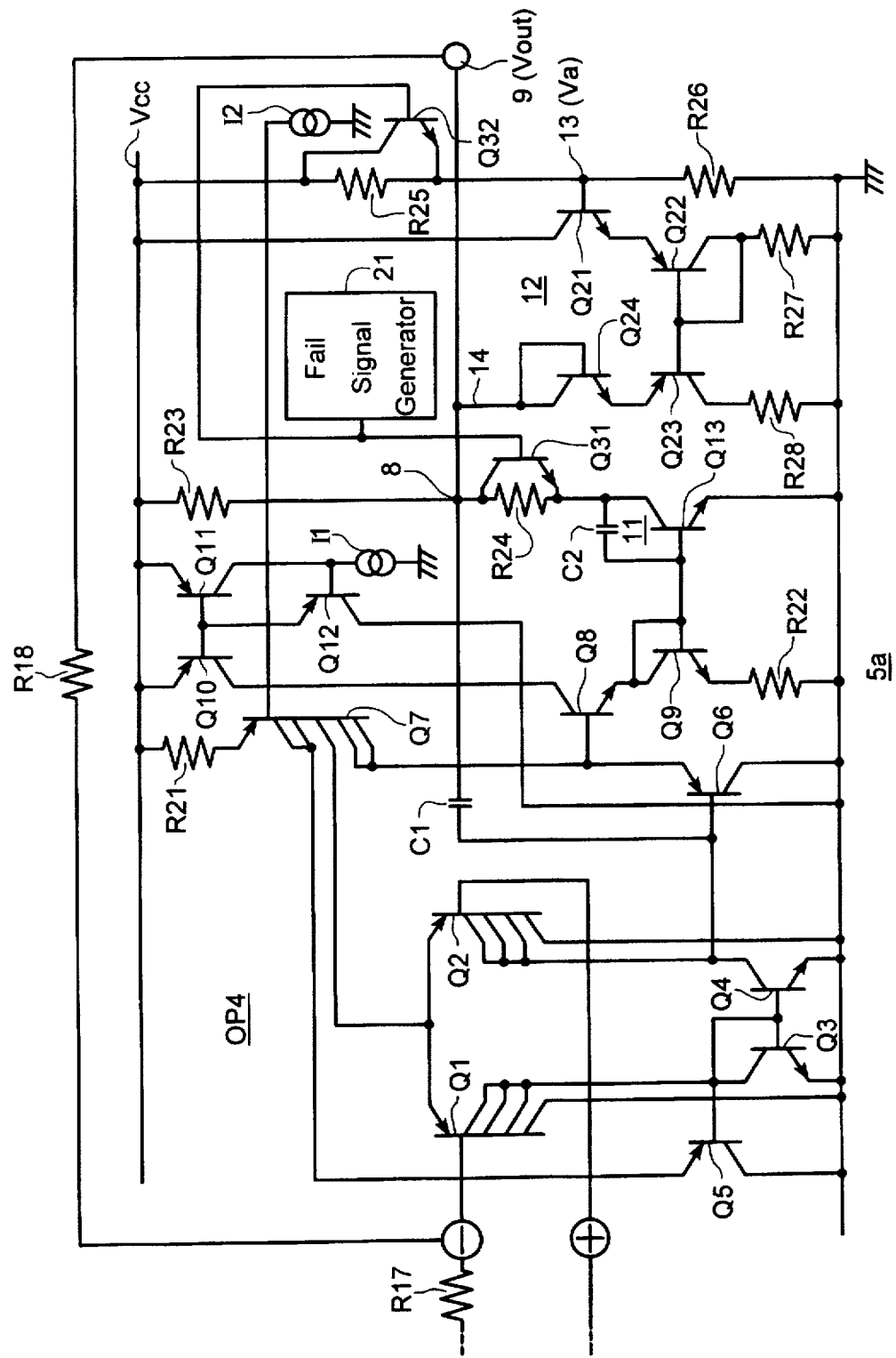
FIG. 5 is a circuit diagram of the last amplifier circuit in the pressure detection apparatus according to the second embodiment of the present invention.

The final-stage amplifier circuit 5a of the pressure detection apparatus according to the second embodiment of the present invention is shown in FIG. 5. This alternative final-stage amplifier circuit 5a may be used as the fourth amplifier circuit 5 of the first embodiment shown in FIG. 2 and includes a fail signal generator 21, and npn transistors Q31 and Q32, the on/off states of which are controlled according to the output from the fail signal generator 21.

The fail signal generator 21 supplies the fail signal to transistors Q31 and Q32 when a failure is detected, i.e., when in the fail state, thereby causing transistor Q31 to short both ends of resistance R24 of the lower limit clamping circuit 11, and transistor Q32 to short the ends of resistance R25 to stop the upper limit clamping circuit 12 from functioning.

The emitter of transistor Q31 is connected to the collector of output transistor Q13, the collector is connected to the junction 8 between resistances R23 and R24, and the base is supplied with the fail signal from the fail signal generator 21. The emitter of transistor Q32 is connected to the junction 13 between resistances R25 and R26, the collector is connected to the power supply voltage Vcc, and the base is supplied with the fail signal from the fail signal generator 21.

Note that like parts in FIGS. 5 and 2 are shown with the same references, and repetetive description thereof is omitted.

Figure 6:
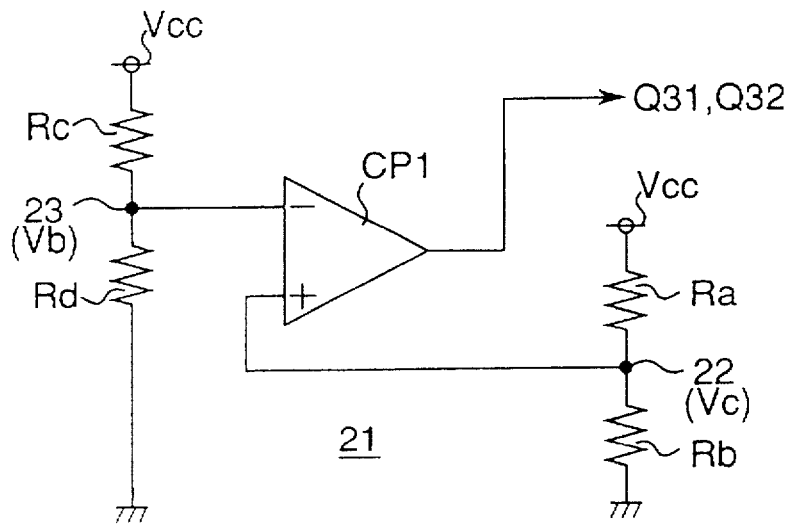
FIG. 6 is a circuit diagram of the fail signal generator supplying the fail signal to the lower limit clamping circuit and the upper limit clamping circuit of the amplifier circuit shown in FIG. 5.
Figure 7:
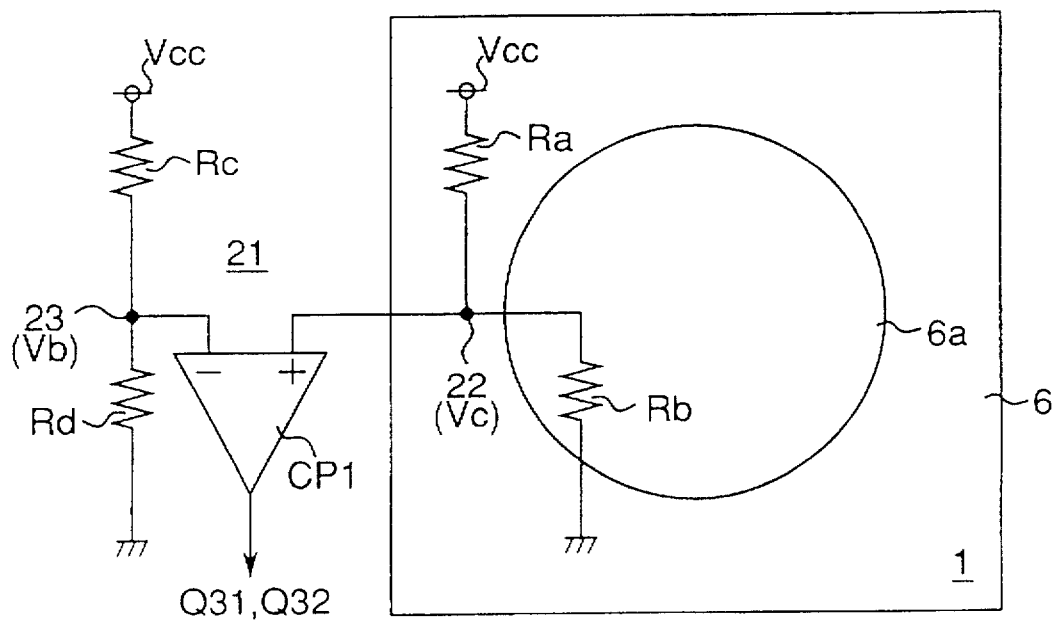
FIG. 7 is used to describe one configuration of the semiconductor diaphragm and the resistor of the fail signal generator shown in FIG. 6 and formed on the semiconductor diaphragm.

As shown in FIG. 6, the fail signal generator 21 includes a comparator CP1, and resistances Ra, Rb, Rc, and Rd. The non-inverting input terminal of the comparator CP1 is connected to the junction 23 between resistances Rc and Rd, which are connected in series between the power supply voltage Vcc and the ground. As shown in FIG. 7, one of the four resistances Ra, Rb, Rc, and Rd of the fail signal generator 21 (FIG. 6), specifically resistance Rb in this example, is formed on the diaphragm member 6a of the semiconductor diaphragm 6. If the voltages supplied to the inverting input terminal and the non-inverting input terminal of the comparator CP1 in this fail signal generator 21 are Vb and Vc, respectively, the resistance values of the resistances Ra, Rb, Rc, and Rd are set so that the statement Vcc>Vb>Vc is true.

It should be noted that the comparator CP1 and resistances Rc and Rd of the fail signal generator 21 may be formed outside the semiconductor diaphragm 6 as shown in FIG. 7, or on the semiconductor diaphragm 6. While not shown in FIG. 7, the resistance bridge circuit 7 shown in FIG. 3 is formed on the diaphragm member 6a of the semiconductor diaphragm 6.

When the pressure detection apparatus according to the second embodiment described above is in the normal operating mode, i.e., the pressure applied to the diaphragm member 6a of the semiconductor diaphragm 6 is not sufficient to damage the diaphragm member 6a, the output from the comparator CP1 of the fail signal generator 21 will be LOW because Vcc>Vb>Vc. As a result, both the transistor Q31 connected to resistance R24, and the transistor Q32 connected to the resistance R25, are OFF. The operation of the final-stage amplifier circuit 5a shown in FIG. 5 during normal state operation, i.e., operation when the pressure applied to the diaphragm member 6a of the semiconductor diaphragm 6 is not sufficient to damage the diaphragm member 6a, is therefore identical to that of the fourth amplifier circuit 5 shown in FIG. 2 according to the present invention the first embodiment of the invention above.

When an extreme pressure load exceeding the failure threshold of the diaphragm member 6a of the semiconductor diaphragm 6 is applied thereto, breaking the diaphragm member 6a and resulting in a fail state, the fail signal generator resistance Rb formed on the diaphragm member 6a is interrupted. Interruption of resistance Rb pulls the non-inverting input terminal of the fail signal generator comparator CP1 up to the power supply voltage Vcc (a HIGH state) via resistance Ra, and this HIGH is output from the comparator CP1. As a result, both the transistor Q31 connected to resistance R24, and the transistor Q32 connected to resistance R25, are ON.

When transistor Q31 is ON, both ends of resistance R24 are shorted, and the clamping function of the lower limit clamping circuit 11 to the output voltage $V_{out}$ of the final-stage amplifier circuit 5a is cancelled. When transistor Q32 is ON, the potential Va of junction 13 rises to the power supply potential Vcc, and the clamping function of the upper limit clamping circuit 12 to the output voltage $V_{out}$ of the final-stage amplifier circuit 5a is cancelled.

Thus, when the diaphragm member 6a of the semiconductor diaphragm 6 is damaged and resistance Rb of the fail signal generator 21 is interrupted, the clamping functions performed by both the lower limit clamping circuit 11 and the upper limit clamping circuit 12 are cancelled. When resistance Rb of the fail signal generator 21 is interrupted, the output voltage VOUt of the final-stage amplifier circuit 5a is either a value exceeding the upper clamping value VU or smaller than the lower clamping value VL. It is therefore possible to determine from the output voltage $V_0$Ut of the final-stage amplifier circuit 5a that the diaphragm member 6a of the semiconductor diaphragm 6 has failed.

Figure 8:
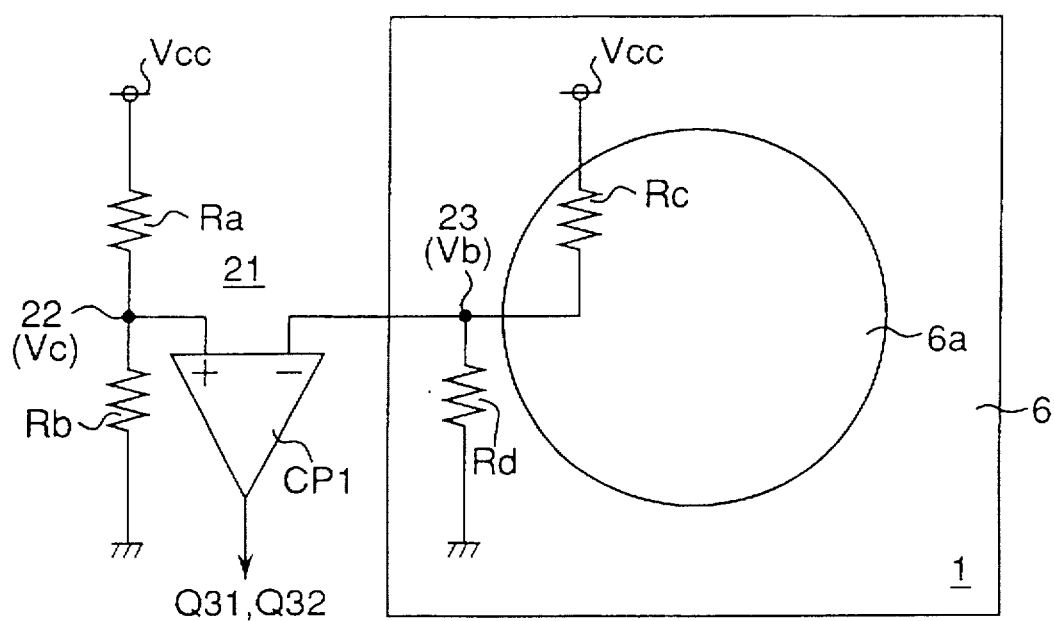
FIG. 8 is used to describe another configuration of the semiconductor diaphragm and the resistor of the fail signal generator shown in FIG. 6 and formed on the semiconductor diaphragm.

In the second embodiment of the invention thus described, it is also possible to form resistance Rc of the fail signal generator 21 (FIG. 6) on the diaphragm member 6a of the semiconductor diaphragm 6 as shown in FIG. 8. The resistance values of the resistances Ra, Rb, Rc, and Rd are again set in this case so that Vcc>Vb>Vc.

If in this case the diaphragm member 6a of the semiconductor diaphragm 6 fails and resistance Rc of the fail signal generator 21 is interrupted, the output of the comparator CP1 in the fail signal generator 21 inverts from LOW to HIGH, and both transistors Q31 and Q32 (FIG. 5) connected to the output of the comparator CP1 become ON. This cancels the clamping functions of the lower limit clamping circuit 11 and upper limit clamping circuit 12, and allows the final-stage amplifier circuit output voltage $V_{out}$ to range above the upper clamping value VU or below the lower clamping value VL. It is therefore possible to determine from the output voltage $V_{out}$ of the final-stage amplifier circuit 5a that the diaphragm member 6a of the semiconductor diaphragm 6 has failed.

Figure 9:
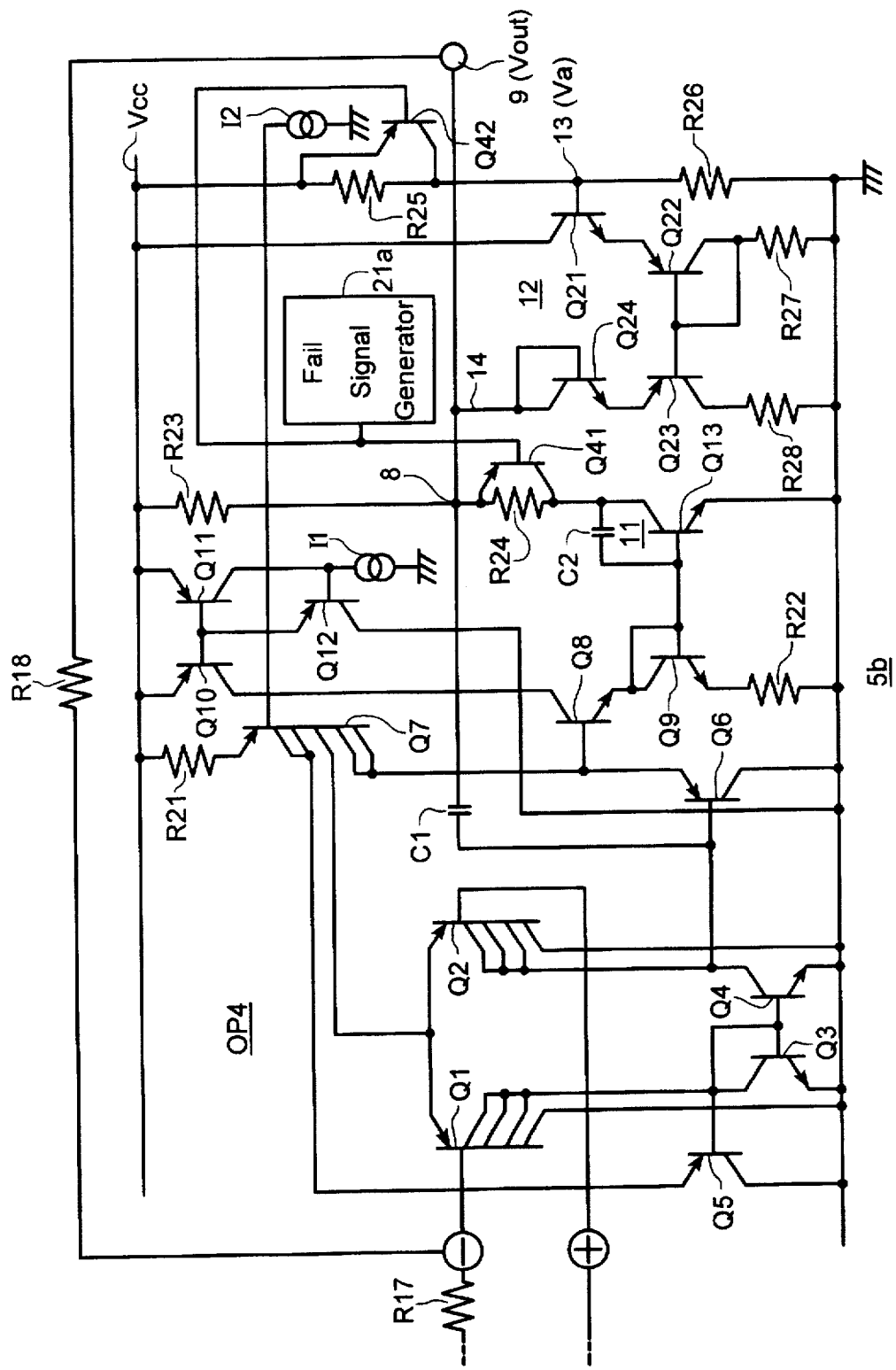
FIG. 9 is a circuit diagram of an alternative embodiment of the last amplifier circuit in the pressure detection apparatus according to the second embodiment of the present invention.

It should be noted that the npn transistor Q31 for cancelling the clamping operation of the lower limit clamping circuit 11, and the npn transistor Q32 for cancelling the clamping operation of the upper limit clamping circuit 12, can be replaced in the final-stage amplifier circuit 5a shown in FIG. 5 with pnp transistors Q41 and Q42 as shown in FIG. 9. The two fail signal generators 21a for turning these pnp transistors Q41 and Q42 on/off are shown in FIGS. 10 and 11.

Figure 10:
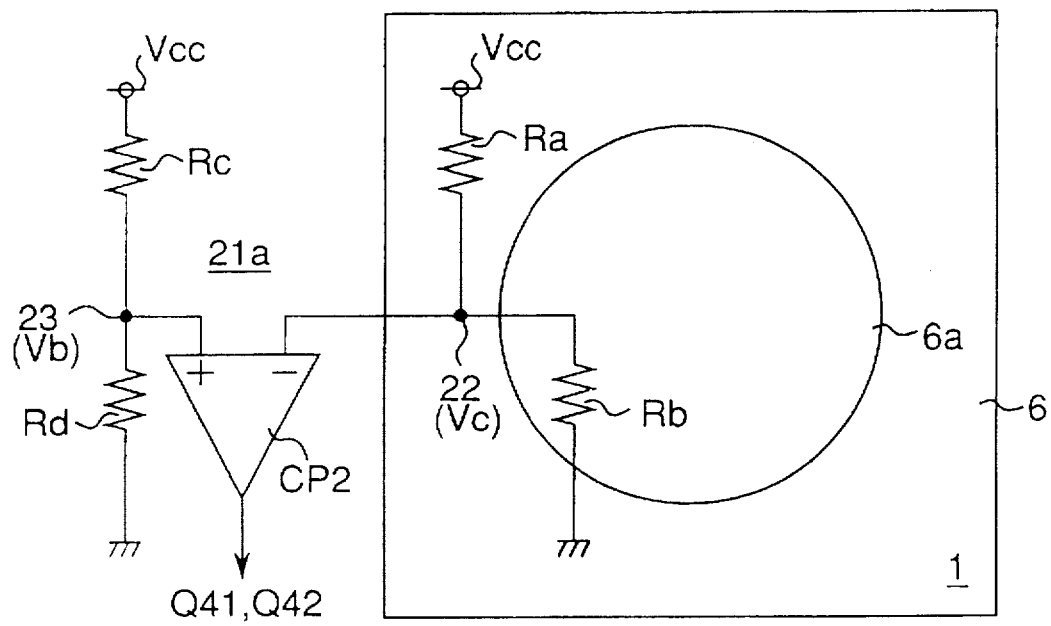
FIG. 10 is used to describe one configuration of the semiconductor diaphragm and the resistor of the fail signal generator shown in FIG. 9 and formed on the semiconductor diaphragm.

With the fail signal generator 21a shown in FIG. 10, the diaphragm member 6a of the semiconductor diaphragm 6 fails when Vcc>Vb>Vc and resistance Rb of the fail signal generator 21a is interrupted. This causes the output of the comparator CP2 in the fail signal generator 21a to invert from HIGH to LOW, causing both transistors Q41 and Q42 of the final-stage amplifier circuit 5b (FIG. 9) connected to the output of the comparator CP2 to become ON. This cancels the clamping functions of the lower limit clamping circuit 11 and upper limit clamping circuit 12, and allows the final-stage amplifier circuit output voltage $V_{out}$ to range above the upper clamping value VU or below the lower clamping value VL. It is therefore possible to determine from the output voltage VOUt of the final-stage amplifier circuit 5b that the diaphragm member 6a of the semiconductor diaphragm 6 has failed.

Figure 11:
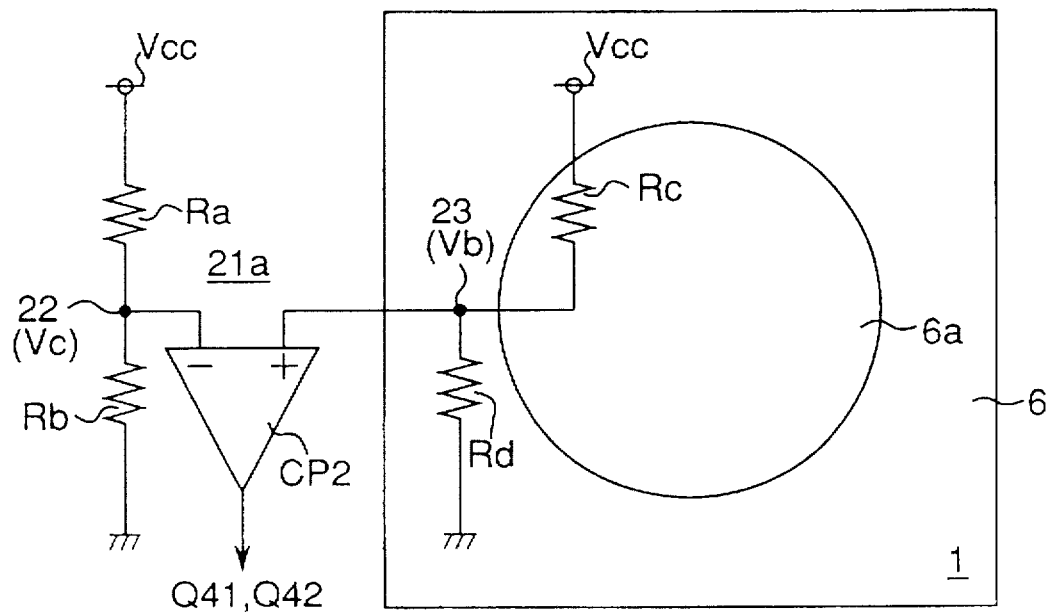
FIG. 11 is used to describe another configuration of the semiconductor diaphragm and the resistor of the fail signal generator shown in FIG. 9 and formed on the semiconductor diaphragm.

With the fail signal generator 21a shown in FIG. 11, the diaphragm member 6a of the semiconductor diaphragm 6 fails when Vcc>Vb>Vc and resistance Rc of the fail signal generator 21a is interrupted. This causes the output of the comparator CP2 in the fail signal generator 21a to invert from HIGH to LOW, causing both transistors Q41 and Q42 of the final-stage amplifier circuit 5b (FIG. 9) connected to the output of the comparator CP2 to become ON. This cancels the clamping functions of the lower limit clamping circuit 11 and upper limit clamping circuit 12, and allows the final-stage amplifier circuit output voltage VOUt to range above the upper clamping value VU or below the lower clamping value VL. It is therefore possible to determine from the output voltage $V_{out}$ of the final-stage amplifier circuit 5b that the diaphragm member 6a of the semiconductor diaphragm 6 has failed.

Embodiment 3

Figure 12:
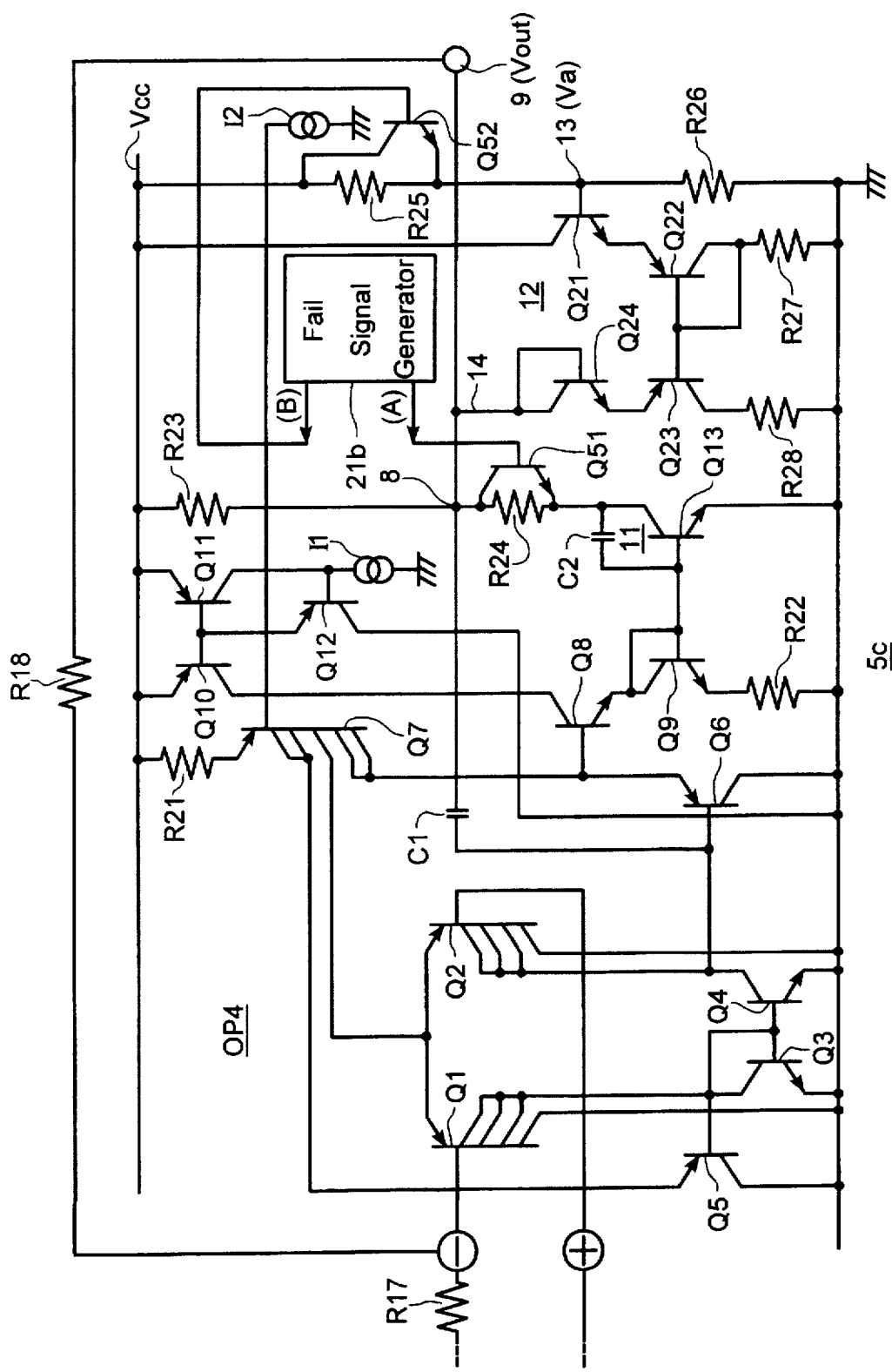
FIG. 12 is a circuit diagram of the last amplifier circuit in the pressure detection apparatus according to the third embodiment of the present invention.
Figure 13:
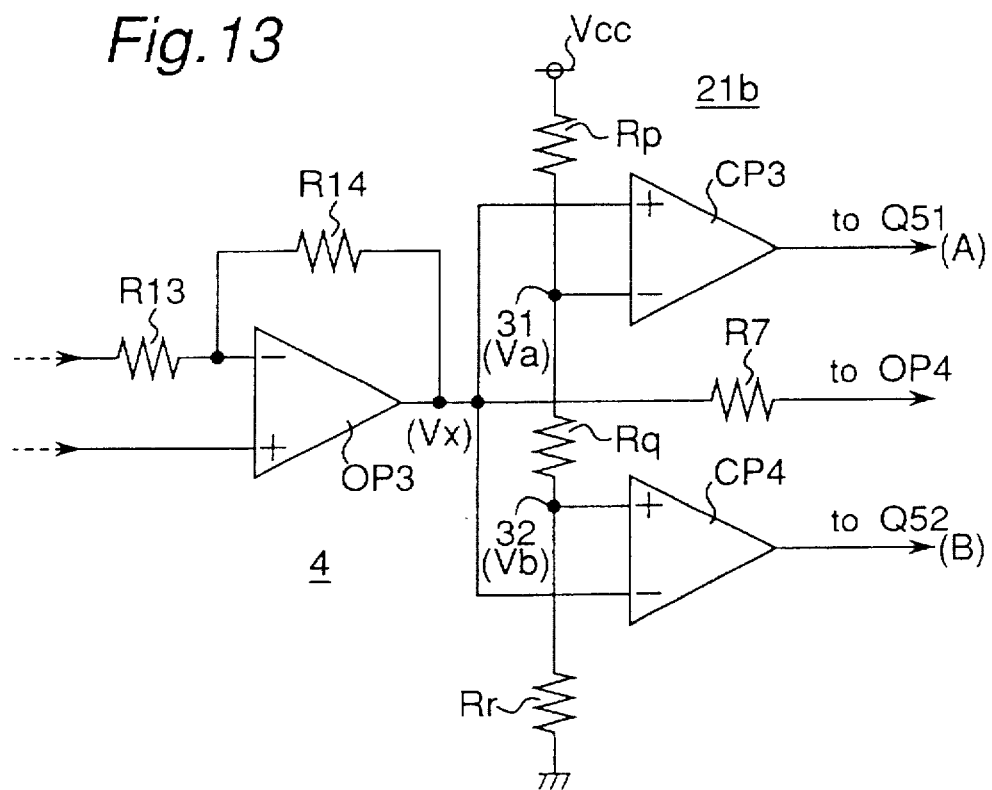
FIG. 13 is a circuit diagram of the fail signal generator supplying the fail signal to the lower limit clamping circuit and the upper limit clamping circuit of the amplifier circuit shown in FIG. 12.

The final-stage amplifier circuit 5c of the pressure detection apparatus according to the third embodiment of the present invention is shown in FIG. 12. This final-stage amplifier circuit 5c may be used as the last-stage amplifier circuit 5a of the second embodiment shown in FIG. 5 and described above including a fail signal generator 21b built as shown in FIG. 13 in place of the fail signal generator 21 shown in FIG. 5. Note that like parts in FIGS. 12 and 5 are identified by like references, and further description thereof is omitted below.

This fail signal generator 21b outputs the cancel clamping signal specifying cancellation of the signal clamping operations of the lower limit clamping circuit 11 and upper limit clamping circuit 12 of the final-stage amplifier circuit 5c (FIG. 12) when the output signal Vx of the operational amplifier OP3 of the amplifier circuit 4 preceding the final-stage amplifier circuit 5c of the pressure detection apparatus is detected outside the range Va≧Vx≧Vb.

As shown in FIG. 13, the fail signal generator 21b includes resistances Rp, Rq, and Rr, and two comparators CP3 and CP4, to each of which is input the output signal Vx from the operational amplifier OP3 of the amplifier circuit 4 preceding the final-stage amplifier circuit 5c of the pressure detection apparatus.

The three resistances Rp, Rq, and Rr are connected in series between the power supply voltage Vcc and the ground. The non-inverting input terminal of the comparator CP3 is connected to the output terminal of the operational amplifier OP3, and the inverting input terminal is connected to a junction 31 between resistances Rp and Rq. The inverting input terminal of the other comparator CP4 is connected to the output terminal of the operational amplifier OP3, and the non-inverting input terminal is connected to a junction 32 between resistances Rq and Rr.

When the pressure detection apparatus according to the third embodiment described above is in the normal operating mode, i.e., the pressure applied to the diaphragm member 6a of the semiconductor diaphragm 6 (FIG. 1) is not sufficient to damage the diaphragm member 6a and the output signal Vx of the amplifier circuit 4 shown in FIG. 13 is in the range Va≧Vx≧Vb, the outputs A and B from the comparators CP3 and CP4, respectively, are both LOW. Both npn transistors Q51 and Q52 (FIG. 12) are therefore OFF. As a result, the final-stage amplifier circuit 5c (FIG. 12) continues to function normally, and the lower limit clamping circuit 11 and upper limit clamping circuit 12 clamp the output signal as required.

However, when the pressure applied to the diaphragm member 6a of the semiconductor diaphragm 6 (FIG. 1) is sufficient to damage the diaphragm member 6a, the diaphragm member 6a of the semiconductor diaphragm 6 therefore fails, and the output signal Vx of the amplifier circuit 4 in FIG. 13 exceeds Va (Vx>Va), the output A from the one comparator CP3 becomes HIGH and the output B from the other comparator CP4 becomes LOW. As a result, npn transistor Q51 of the final-stage amplifier circuit 5c (FIG. 12) switches ON to cancel the signal clamping operation of the lower limit clamping circuit 11. The other npn transistor Q52, however, remains OFF, and the upper limit clamping circuit 12 continues to function. Because the final-stage amplifier circuit 5c is an inverting amplifier, however, the output voltage $V_{out}$ of the final-stage amplifier circuit 5c drops below the lower clamping value VL when the output signal Vx of the preceding amplifier 4 surpasses Va (Vx>Va). It is therefore possible to determine from the output voltage $V_{out}$ of the final-stage amplifier circuit 5c that the semiconductor diaphragm 6 has failed.

If in the fail state as described above the output signal Vx of the amplifier circuit 4 preceding the final-stage amplifier circuit 5c is lower than Vb (Vb>Vx), the output states described above are reversed, i.e., the output A from the one comparator CP3 is LOW, and the output B from the other comparator CP4 is HIGH. As a result, the npn transistor Q52 (FIG. 12) becomes ON to cancel the signal clamping operation of the upper limit clamping circuit 12. It follows that operation of the lower limit clamping circuit 11 is not cancelled because npn transistor Q51 remains OFF. However, because the final-stage amplifier circuit 5c is an inverting amplifier as described above, the output voltage $V_{out}$ of the final-stage amplifier circuit 5c rises above the upper clamping value VU when the output signal Vx of the preceding amplifier 4 drops below Vb (Vb>Vx). It is therefore still possible to determine from the output voltage $V_{out}$ of the final-stage amplifier circuit 5c that the semiconductor diaphragm 6 has failed.

Figure 14:
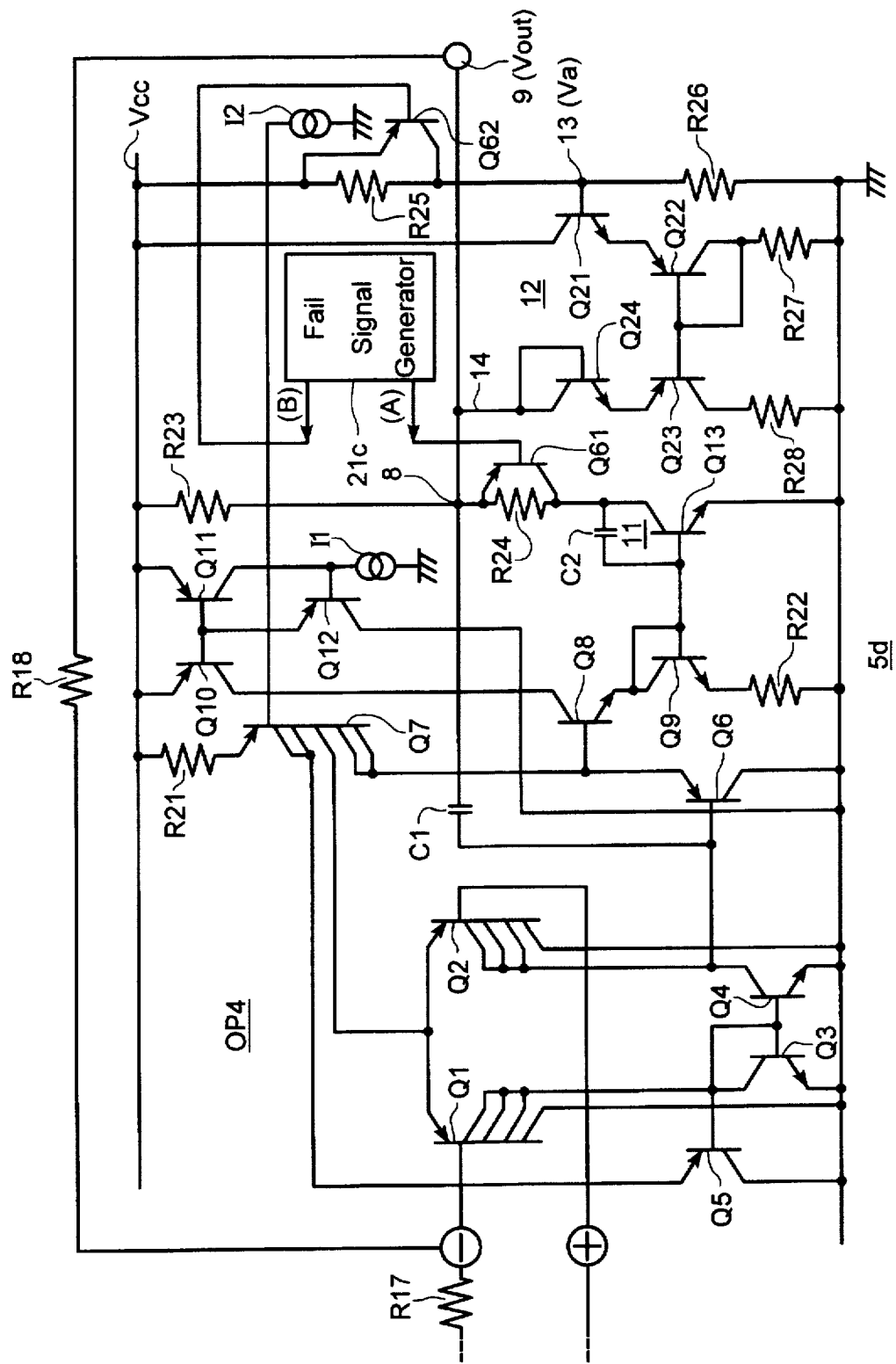
FIG. 14 is a circuit diagram of an alternative embodiment of the last amplifier circuit in the pressure detection apparatus according to the third embodiment of the present invention.
Figure 15:
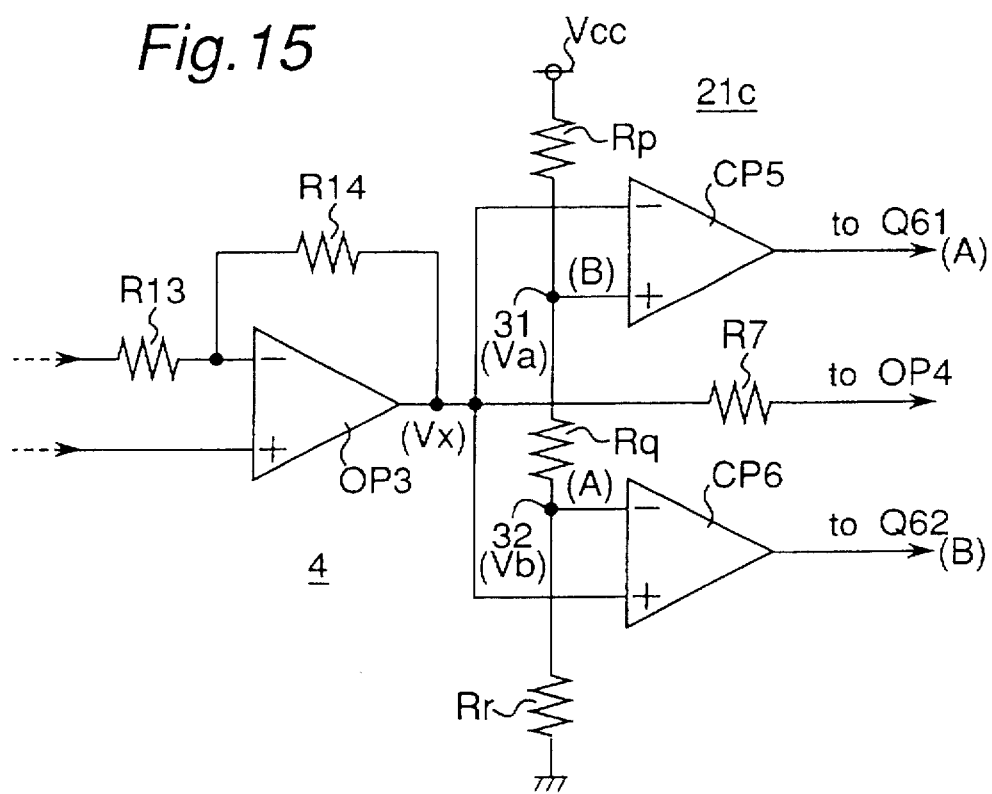
FIG. 15 is a circuit diagram of the fail signal generator supplying the fail signal to the lower limit clamping circuit and the upper limit clamping circuit of the amplifier circuit shown in FIG. 14.

It should be noted that while npn-type transistors Q51 and Q52 are used in the final-stage amplifier circuit 5c shown in FIG. 12 according to the third embodiment of the invention to stop operation of the lower limit clamping circuit 11 and upper limit clamping circuit 12, respectively, these npn transistors Q51 and Q52 can be replaced with pnp transistors Q61 and Q62 as shown in FIG. 14. In this case, the output terminal of the amplifier circuit 4 preceding the final-stage amplifier circuit 5d is connected to both the inverting input terminal of the one comparator CP5 of the fail signal generator 21c, and to the non-inverting input terminal of the other comparator CP6 of the fail signal generator 21c. The non-inverting input terminal of the one comparator CP5 is also connected to the junction 31 between resistances Rp and Rq, and the inverting input terminal of the other comparator CP6 is connected to the junction 32 between resistances Rq and Rr.

When the pressure detection apparatus is in the normal operating mode, i.e., the pressure applied to the diaphragm member 6a of the semiconductor diaphragm 6 (FIG. 1) is not sufficient to damage the diaphragm member 6a and the output signal Vx of the amplifier circuit 4 is in the range Va≧Vx≧Vb, the outputs A and B from the comparators CP5 and CP6, respectively, are both HIGH. Both pnp transistors Q61 and Q62 (FIG. 14) are therefore OFF. As a result, the final-stage amplifier circuit 5d (FIG. 14) continues to function normally, and the lower limit clamping circuit 11 and upper limit clamping circuit 12 clamp the output signal as required.

However, when the pressure applied to the diaphragm member 6a of the semiconductor diaphragm 6 (FIG. 1) is sufficient to damage the diaphragm member 6a, the diaphragm member 6a of the semiconductor diaphragm 6 therefore fails, and the output signal Vx of the amplifier circuit 4 preceding the final-stage amplifier circuit 5d exceeds Va (Vx>Va), the output A from the one comparator CP5 becomes LOW and the output B from the other comparator CP6 becomes HIGH. As a result, pnp transistor Q61 of the final-stage amplifier circuit 5d (FIG. 14) switches ON to cancel the signal clamping operation of the lower limit clamping circuit 11. The other pnp transistor Q62, however, remains OFF, and the upper limit clamping circuit 12 continues to function. Because the final-stage amplifier circuit 5d is an inverting amplifier, however, the output voltage $V_{out}$ of the final-stage amplifier circuit 5d drops below the lower clamping value VL when the output signal Vx of the preceding amplifier 4 surpasses Va (Vx>Va) It is therefore possible to determine from the output voltage $V_{OUT}$ of the final-stage amplifier circuit 5d that the semiconductor diaphragm 6 has failed.

If in the fail state as described above the output signal Vx of the amplifier circuit 4 preceding the final-stage amplifier circuit 5d is lower than Vb (Vb>Vx), the output states described above are reversed, i.e., the output A from the one comparator CP5 is HIGH, and the output B from the other comparator CP6 is LOW. As a result, the pnp transistor Q62 (FIG. 14) becomes ON to cancel the signal clamping operation of the upper limit clamping circuit 12. It follows that operation of the lower limit clamping circuit 11 is not cancelled because pnp transistor Q61 remains OFF.

However, because the final-stage amplifier circuit 5d is an inverting amplifier as described above, the output voltage $V_{out}$ of the final-stage amplifier circuit 5d rises above the upper clamping value VU when the output signal Vx of the preceding amplifier 4 drops below Vb (Vb>Vx). It is therefore still possible to determine from the output voltage VOUt of the final-stage amplifier circuit 5d that the diaphragm member 6a of the semiconductor diaphragm 6 has failed.

Embodiment 4

The pressure detection apparatus according to any of the preceding embodiments can also be used to detect acceleration by simply providing a mass M for detecting acceleration on the diaphragm member 6a of the semiconductor diaphragm 6 as shown by the dot-dot-dash lines in FIGS. 3 and 4.

Effects of the invention

A pressure detection apparatus as thus described is able to determine from the output of the final-stage amplifier circuit 5 that a fail state has occurred because the output of the final-stage amplifier circuit 5 is not clamped when a fail state occurs, i.e., pressure exceeding the failure threshold of the pressure detection member is applied thereto.

In addition to the above result the pressure detection apparatus can also reliably detect when a fail state has occurred from failure of the pressure detection member because failure of the pressure detection member cuts off part of the signal clamping means, and clamping the final-stage amplifier circuit is therefore cancelled.

In an alternative pressure detection apparatus, failure of the semiconductor diaphragm when a problem occurs cuts off part of the signal clamping means formed on the diaphragm, and clamping the final-stage amplifier circuit is therefore cancelled. As a result, it is also possible to reliably determine from failure of the semiconductor diaphragm that the pressure detection apparatus has failed.

In another alternative of the pressure detection apparatus, a cancel clamping signal is supplied from the failure detection means to the signal clamping means when a failure occurs. By thus providing a failure detection means separately from the signal clamping circuit, the pressure detection apparatus provides a greater degree of freedom in the design of the pressure detection apparatus while still enabling fail state detection based on the output of the final-stage amplifier circuit.

In still another alternative of the pressure detection apparatus, part of the resistance circuit supplying a comparison voltage to the comparator is disposed outside the pressure detection member so that the comparison voltage can be freely set. Thus, in addition to the benefits described above, this alternative provides an even greater degree of freedom in the design of the pressure detection apparatus, and enables the user to freely set the comparison voltage according to the apparatus in which the pressure detection apparatus is provided.

In the pressure detection apparatus according to yet another alternative, the resistance of the resistance circuit formed on the semiconductor diaphragm is cut off when abnormally high pressure is applied to and causes the semiconductor diaphragm to fail. Thus, this alternative can reliably determine from failure of the semiconductor diaphragm that the fail state has been entered.

In the pressure detection apparatus according to still another alternative, the failure detection means detects when a failure has occurred from the output signal of the amplifier circuit preceding the final-stage amplifier circuit, and supplies a cancel clamping signal to the signal clamping means. Thus, the invention of this alternative in pressure detection apparatus design because it is possible to detect pressure detection member failure without providing part of the failure detection means circuitry.

With the pressure detection apparatus according to yet another alternative, the pressure applied to the pressure detection member is based on the acceleration, and the pressure detection member fails when acceleration exceeds a predetermined value. It is therefore possible to determine fail states caused by the application of acceleration exceeding a predetermined threshold value.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pressure detecting apparatus comprising clamping means for clamping a detected pressure signal, which is output by a final stage of an amplifying means used to amplify a detected pressure signal output by the a pressure detection member detecting pressure applied thereto, to a predefined maximum or minimum value when the detected pressure signal is not between the predefined maximum and minimum values, wherein signal clamping by said clamping means is cancelled when the pressure applied to the pressure detection member exceeds a predetermined value that results in an operational failure.

2. The pressure detection apparatus according to claim 1 wherein part of the clamping means is formed on the pressure detection member such that signal clamping is interrupted when an operational failure occurs by interrupting part of the clamping means.

3. The pressure detection apparatus according to claim 2 wherein the pressure detection member is a semiconductor diaphragm such that signal clamping is interrupted by destruction of said semiconductor diaphragm when an operational failure occurs.

4. The pressure detection apparatus according to claim 1 further comprising failure detection means for detecting equipment failures and supplying a "cancel clamping" signal to the clamping means when an operational failure occurs.

5. The pressure detection apparatus according to claim 4, wherein the failure detection means includes:

a resistance circuit having a resistance that is cut off when an operational failure occurs, and a comparator to which a comparison voltage is supplied from the resistance circuit.

6. The pressure detection apparatus according to claim 5, wherein the pressure detection member is a semiconductor diaphragm and the resistance circuit is formed on the semiconductor diaphragm.

7. The pressure detection apparatus according to claim 4 wherein the failure detection means detects operational failures based on the output signal from a stage of said amplifying means preceding said final stage and supplies the cancel clamping signal to the clamping means.

8. The pressure detection apparatus according to claim 1 wherein the pressure applied to the pressure detection member is a pressure value relating to acceleration.

9. A method of detecting failure of a pressure detecting apparatus, comprising the steps of:

detecting pressure with the pressure detecting apparatus;

generating a pressure detection signal from the pressure detected in said detecting step;

maintaining the pressure detection signal within a predetermined range of values; and forming a circuit element on the pressure detecting apparatus, wherein when the pressure detecting apparatus fails due to excessive pressure applied thereto, the circuit element also fails causing said maintaining step to stop functioning and thereby permitting the pressure detection signal to deviate outside of the predetermined range of values thereby indicating failure of the semiconductor pressure detecting apparatus.

10. The method of detecting failure of a semiconductor pressure detecting apparatus according to claim 9, wherein the pressure detecting apparatus includes a semiconductor diaphragm, said forming step forming the circuit element on the semiconductor diaphragm, wherein when the semiconductor diaphragm breaks due to excessive pressure applied thereto, the circuit element also breaks causing said maintaining step to stop functioning and thereby permitting the pressure detection signal to deviate outside of the predetermined range of values thereby indicating failure of the semiconductor pressure detecting apparatus.

* * * * *

UNITED STATES PATENT AND TRADEMARK OFFICE
CERTIFICATE OF CORRECTION

PATENT NO. : 5,793,297
DATED : 8/11/98
INVENTOR(S) : Takeuchi et al.

It is certified that error appears in the above-identified patent and that said Letters Patent is hereby corrected as shown below:

Column 12, line 22, delete "the".

Signed and Sealed this

Twenty-third Day of February, 1999

Attest:

Q. TODD DICKINSON

Attesting Officer

Acting Commissioner of Patents and Trademarks